July 16, 1968    P. M. HAMMOND ET AL    3,393,287
AUTOMATIC WELDING MACHINE

Filed March 29, 1965    7 Sheets-Sheet 1

INVENTORS:
PRESTON M. HAMMOND
FRANCIS M. BRENNAN
LOMAX S. ANDERSON

E. Mickey Hubbard
ATTORNEY

United States Patent Office 3,393,287
Patented July 16, 1968

3,393,287
AUTOMATIC WELDING MACHINE
Preston M. Hammond and Francis M. Brennan, Richardson, Tex., and Lomax S. Anderson, Villeneuve-Loubet, France; said Hammond and said Brennan assignors to Texas Instruments Incorporated, Dallas, Tex., a corporation of Delaware
Filed Mar. 29, 1965, Ser. No. 443,339
14 Claims. (Cl. 219—79)

ABSTRACT OF THE DISCLOSURE

A machine for sequentially resistively welding a plurality of small workpieces. The apparatus comprises a support component containing a power supply, electrical contacts, a conveyor system and an assembly fixture unit for use with the support component. The fixture unit contains both a plurality of weld electrodes and a plurality of workpieces in portion for welding. The fixture block assembly is indexed past the electrical contacts of the weld station so that the contacts supply electric current to the electrodes of the fixture to facilitate welding.

---

This invention relates to automatic welding machines, and more particularly, but not by way of limitation, to a machine for resistively welding two very small members such as, for example, the lead wire and eyelet of a transistor header.

In the manufacture of transistors and similar solid state electronic devices, it is customary to weld a small lead wire to a small metal eyelet or disk. Since this is but one step of many in the fabrication of a transistor, it is imperative that it be performed at a high rate on an economical basis. Previous attempts to automate this welding step have been based on the concept of continuously and automatically feeding the leads and eyelets into an indexing mechanism which both holds the leads and eyelets in mated pairs and also transports the mated pairs to a welding electrode. In order to achieve even the low production rate of 2,400 units per hour, such welding machines have necessarily required complex mechanical movements and very close tolerances for handling the small components in order to achieve an acceptable mechanical efficiency and high yield of good units.

An important object of this invention is to provide an automatic welding machine which is capable of welding wire leads to eyelets or the like at a rate of 40,000 per hour with a 98% mechanical efficiency.

Another object of the invention is to provide a welding machine of the type described which is capable of welding various types of components with a minimum number of simple, low tolerance adjustments.

A further object of the invention is to provide such a system wherein the tolerances required of moving parts are unusually large.

Another object of the invention is to provide such a machine which is relatively simple and which can be economically manufactured and operated.

Still another object of the invention is to provide such a machine which can be cleaned, overhauled and adjusted with a minimum of down time.

The automatic welding machine in accordance with this invention comprises a fixture block assembly for holding in weld position a large number of pairs of the members to be welded. The fixture block assembly includes a weld electrode for each pair of members which is electrically insulated from the remainder of the fixture block assembly so that an electrical current can be selectively applied through the electrode to one member of each pair and through the other member of the pair to the remainder of the fixture block assembly. The ends of the weld electrodes extend from the fixture block assembly and are oriented in a plurality of rows each containing correspondingly positioned electrodes. The fixture block assembly is then indexed past a weld station one row at a time. The weld station has a row of contacts corresponding to the number of electrodes in each row and an electric power supply is connected to the weld station contacts. A means is provided to selectively move the weld station contacts against the protruding ends of the weld electrodes so as to apply an electric current to each pair. In the preferred embodiment, a single power supply is used and the weld station contacts are sequentially moved into engagement with the respective electrodes. Thus the single power supply is sequentially shared by the several welding electrodes in each row.

In accordance with a more specific aspect of the invention, each of the weld station contacts is mounted on a pivoted arm and the arms are spring biased into a normally raised position so that the contacts will clear the ends of the electrodes. A cam drum is mounted on a timing shaft and has circumferentially spaced lobes which sequentially engage the arms to lower the weld station contacts against the ends of the weld electrodes. The timing shaft also includes an indexing ratchet means which is coupled to a conveyor system for moving the fixture block assembly and indexing successive rows of electrodes at the weld station. A commutator wheel is connected to the timing shaft to control the power supply and apply current to the weld station contacts after each contact has been lowered against the end of an electrode.

In accordance with a further aspect of the invention, a gang of welding stations are driven from a common drive shaft through a pair of meshing gears at each station which are so arranged that any one of the welding assemblies may be quickly removed from the machine and replaced by another with a minimum of down time.

In accordance with another more specific aspect of the invention, the fixture block assembly is comprised of an electrode fixture block having a plurality of tubular electrodes for receiving wire leads slidably received in and insulated from the block and an eyelet fixture block comprised of an eyelet tray having an aperture oriented in predetermined position relative with respect to each electrode such that when the two fixture blocks are assembled, the end of each lead wire is held in weld position against the eyelet. The eyelet fixture block is preferably comprised of an eyelet tray, a retaining plate, a spacer plate and an electrode plate as hereafter described in greater detail.

Additional aspects, objects and advantages of the invention will be evident to those skilled in the art from the following detailed description and drawings, wherein:

FIGURE 7 is a partial top view of the eyelet tray of the assembly of FIGURE 4;

FIGURE 11 is a sectional view taken substantially on lines 11—11 of FIGURE 2;

FIGURE 12 is a partial front view of one welding subassembly of the machine of FIGURE 1; while

Figure 1:
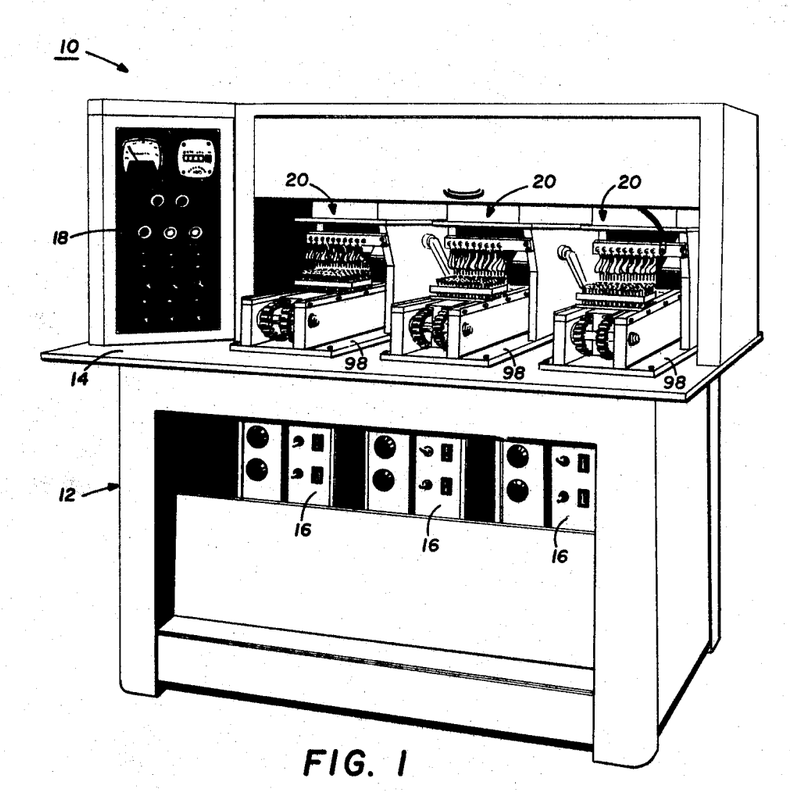
FIGURE 1 is a perspective view of a welding machine constructed in accordance with the present invention.
Figure 2:
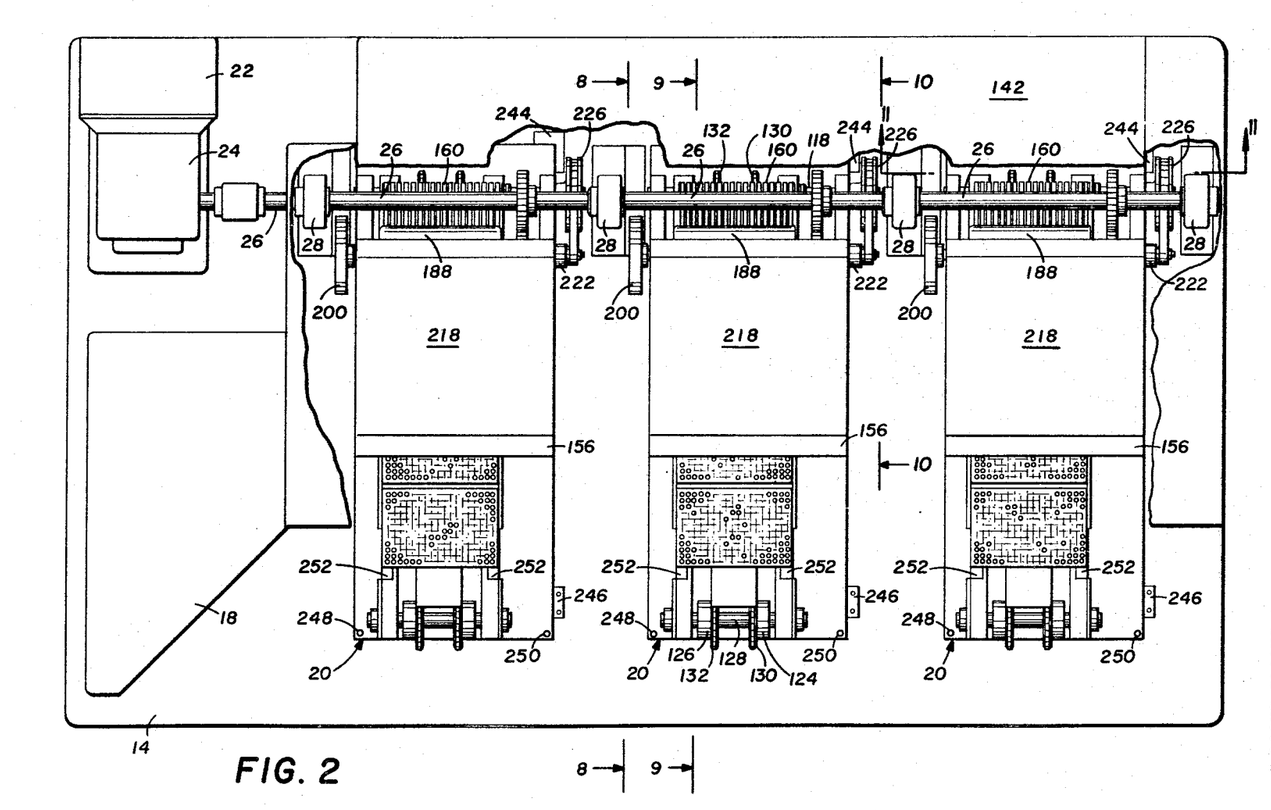
FIGURE 2 is a plan view of a welding machine similar to that shown in FIGURE 1.
Figures 7, 11, 12:
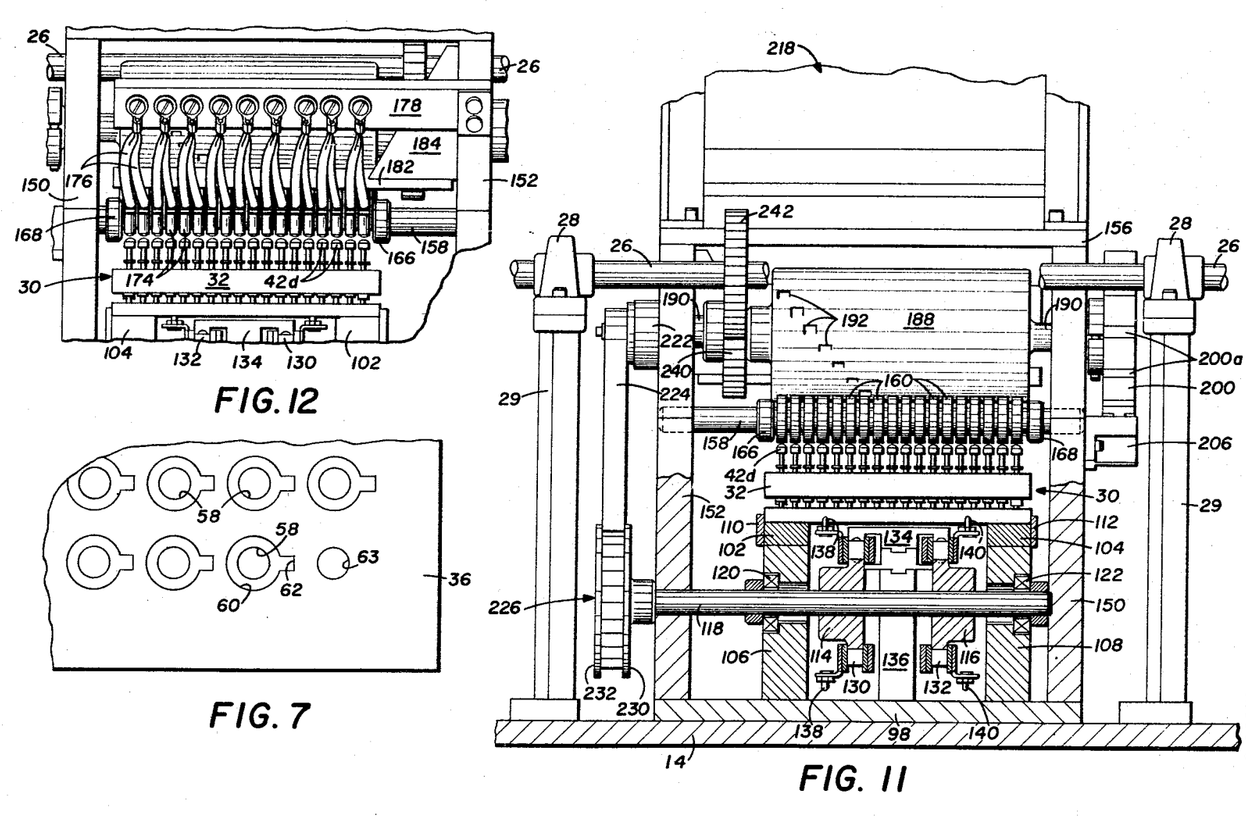

Referring now to the drawings, and in particular to FIGURE 1, a welding machine constructed in accordance with the present invention is indicated generally by the reference numeral 10. The machine 10 may conveniently comprise a cabinet 12 having a waist-high support table 14. The lower portion of the cabinet 12 may house electrical power supplies 16 which are adjusted, monitored and controlled from an instrument panel 18. A plurality of welding subassemblies 20 are supported on the table 14 and are driven from a single motor 22, gearbox 24 and drive shaft 26 as illustrated in FIGURE 2. The drive shaft 26 is journaled in a plurality of bearing blocks 28 which are disposed on top of pedestals 29 connected to the tabletop 14, as shown in FIGURE 11. As will hereafter be described in greater detail, each of the welding subassemblies 20 can be easily and quickly disengaged from the drive shaft 26 for replacement.

Figure 3:
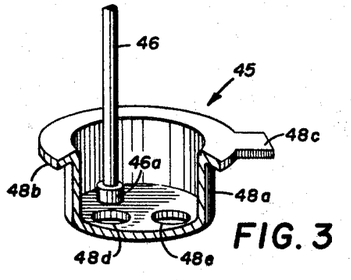
FIGURE 3 is a perspective view of a typical lead wire welded to a typical eyelet by the machine of FIGURE 2.

A typical unit produced by the machine 10 is indicated generally by the reference numeral 45 in FIGURE 3. The unit 45 is used to fabricate a transistor header and is comprised of a lead wire 46 which is welded to the inside face of an eyelet 48. The lead wire 46 has a head portion 46a which facilitates handling as will hereafter become more evident and which also facilitates welding. The eyelet 48 has cylindrical side walls 48a which terminate in a peripheral out-turned flange 48b. A tab 48c provides orientation used for further construction and for installation of the final transistor. A pair of apertures 48d and 48e pass the other two leads through the header in the conventional manner. The header structure is subsequently completed by placing a glass bead in the eyelet having three bores which holds the other two lead wires centered in the apertures 48d and 48e.

Figure 4:
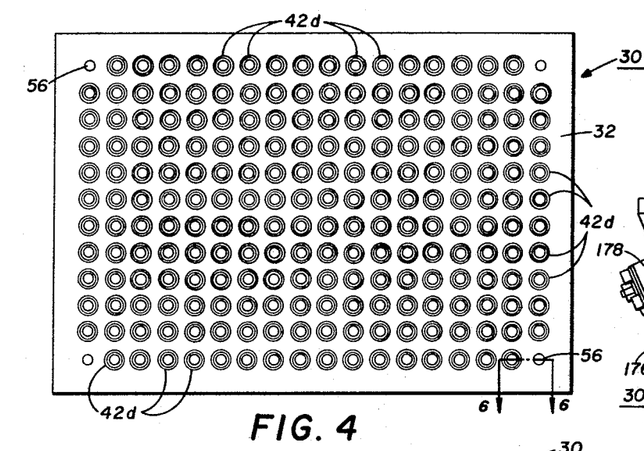
FIGURE 4 is a top view of a fixture block assembly used in the machine of FIGURE 2.
Figure 5:
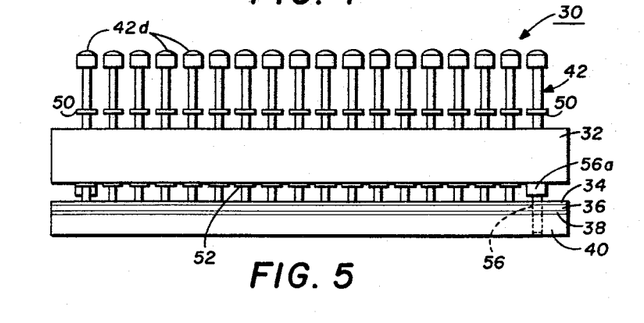
FIGURE 5 is a side view of the fixture block assembly of FIGURE 4.
Figure 6:
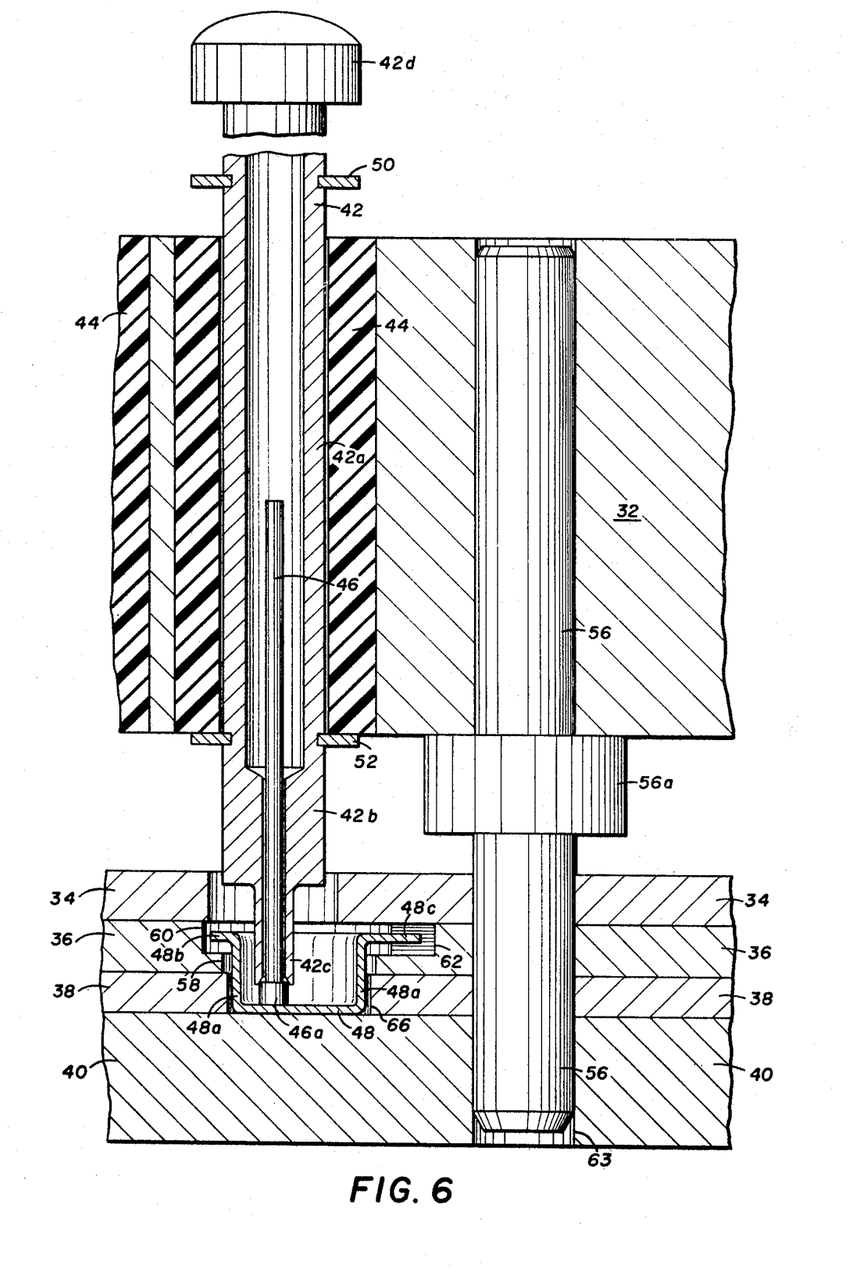
FIGURE 6 is an enlarged sectional view taken substantially on lines 6—6 of FIGURE 4.

Referring now to FIGURES 4–6, a typical fixture block assembly for the machine 10 is indicated generally by the reference numeral 30 and comprises an electrode block 32, a retainer plate 34, an eyelet plate 36, a spacer plate 38 and an electrode plate 40.

The electrode block 32 has a large number of tubular weld electrodes 42 which are slidably received in insulating sleeves 44 inserted in the block 32 as best seen in FIGURE 6. The electrodes 42 are arranged into a plurality of rows as best seen in FIGURE 4. Each electrode is comprised of a tubular body portion 42a, a neck portion 42b having a restricted opening therein for closely receiving a wire lead 46, and a tip 42c which engages the head 46a of the lead wire 46 and protrudes into the cup-shaped eyelet 48. The interior of the tip portion 42c is too small to pass the head 46a and may be tapered as illustrated to facilitate loading. Upper and lower snap rings 50 and 52 limit the travel of the electrodes 42 in either direction to retain the electrodes in the block 32 during handling. An electrode contact 42d is formed at the upper end of the electrode 42 and all of the electrode contacts 42d are disposed generally in the same plane. Guide pins 56 are pressed-fitted into bores in the diagonally opposite corners of the electrode block 32 and are provided with enlarged flange portions 56a to properly locate the pins 56. The guide pins 56 provide the necessary accurate alignment between the various members 32, 34, 36, 38 and 40 as will become more evident from the following description.

The eyelet tray 36 has a circular aperture 58 aligned generally with each of the weld electrodes 42. The apertures 58 are sized to rather freely receive the cylindrical portion 48a of the eyelet 48 but are not sufficiently large to pass the flange portion 48b. A counterbore 60 to each of the bores 58 is sufficiently large to receive the flange 48b and a slot 62 receives the tab 48c of the eyelet. Positioning of the tab 48c in the slot 62 provides the means for orienting the eyelet 48 relative to the lead wire 46 when the eyelet tray is aligned with the electrode block 32. The eyelet tray 36 is provided with apertures 63 at the diagonally opposite corners for receiving the guide pins 56 so as to position each of the eyelets 48 in the correct position relative to the respective wire lead 46.

The retaining plate 34 has a number of apertures 64 which are sized and located to receive the ends of the weld electrodes 42, yet which are sufficiently small to retain the eyelets 48 in the tray 36 when the eyelet tray is inverted and mated with the electrode block 32 as will presently be described.

The spacer plate 38 has a number of apertures 66 which register with the apertures 58 when the plate is aligned by means of the pins 56. The spacer plate 38 is selected such that the total combined thickness of the spacer plate and eyelet tray 36 will be greater than the height of the cylindrical portion of the eyelet 48, but such that the combined thickness of the spacer plate 38 and the portion of the eyelet tray 36 below the counterbore 60 is less than the length of the cylindrical portion 48a of the eyelet. Thus when the electrode plate 40 is placed against the spacer plate 38, the bottom of the eyelet 48 may be pressed tightly against the electrode 40 by the weight of the electrode 42 and electrode block 32 on the head 46a of the wire lead 46. By using both the eyelet tray 36 and the spacer plate 38, the aperture 66 may be more closely the size of the cylindrical portion 48a of the eyelet 48 so as to more precisely locate the eyelet 48, and the aperture 58 somewhat larger to simplify loading of the eyelet tray 36.

The fixture block assemblies 30 are loaded by inverting the electrode block 32 and inserting the wire leads 46 through the tips 42c. The enlarged head 46a retains each wire lead 46 in position in the respective electrode. This task can be expeditiously accomplished using a suitable loading magazine and transfer block. The eyelet tray 36 can be loaded simply by dipping the tray in a container full of eyelets and manipulating the tray until an eyelet is positioned generally in each of the apertures. The eyelet tray 36 may be vibrated on an eccentric vibrator so as to position each of the tabs 48c in the respective slots 62. The retainer plate 34 is then positioned over the eyelet tray 36 and the plates inverted and placed over the guide pins 56. The spacer plate 38 and electrode plate 40 may then be placed over the guide pins 56 to complete loading of the fixture block assembly 30 which can then be turned right side up because the wire leads will be retained in place by the eyelet.

Figure 8:
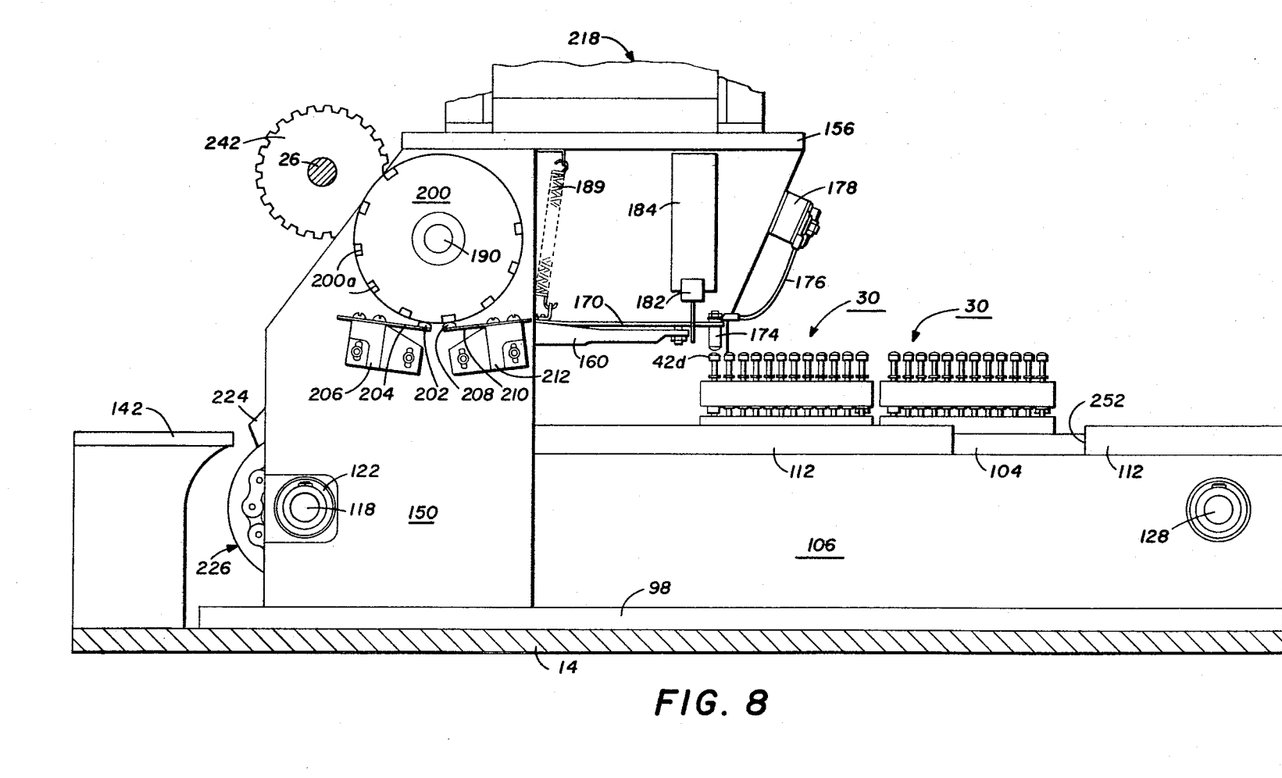
FIGURE 8 is a sectional view taken substantially on lines 8—8 of FIGURE 2.

Each of the welding assemblies 20 is of identical construction and only one will now be described in detail. The assembly 20 is preferably assembled on a base plate 98 which merely rests at a predetermined position on the tabletop 14 as will hereafter be described in greater detail. A conveyor system indicated generally by the reference numeral 100 is provided to transport the fixture block assemblies 30 past a weld station as will hereafter be described in greater detail. The conveyor system 100 comprises a pair of electrically conductive slide rails 102 and 104 which may be formed from a good electrical conductor such as copper. The slide rails may be mounted on elongated plates 106 and 108 and may have retaining side plates 110 and 112. Chain sprockets 114 and 116 are mounted on a shaft 118 which is journaled in bearings 120 and 122 at the rear ends of the plates 106 and 108. Similar chain sprockets 124 and 126 are mounted on a shaft 128 which is journaled in the front ends of the plates 106 and 108. An endless chain 130 passes around the sprockets 114 and 124, and a similar endless chain 132 passes around the sprockets 116 and 126. A guide rail 134 extends along the upper reaches of both chains 130 and 132 to stabilize the chains. The guide rail 134 may be supported on a plate 136 which is connected to the base plate 98. Upstanding lugs 138 are secured to the chain 130 at spaced points and identical lugs 140 are fixed on the chain 132 at corresponding positions. The lugs 138 and 140 extend into the electrode plate 40 of the fixture block assemblies 30 so that as the chains 130 and 132 are driven, the fixture block assemblies will be moved along the slide rails 102 and 104. The conveyor system 100 is driven by an indexing ratchet means as will hereafter be described in greater detail. An apron 142 is located at the rear end of all assemblies 20 and is disposed at the same height as the rails 102 and 104 to receive the fixture block assemblies 30 after they have passed through the weld stations.

A pair of supports 150 and 152 are connected on opposite sides of the base plate 98 and are disposed on opposite sides of the rails 102 and 104. The upper ends of the supports 150 and 152 are interconnected by a top plate 156. A fixed shaft 158 extends between the plates 150 and 152. A plurality of contact arms 160 (eighteen being illustrated) are pivotally mounted on the shaft 158. Each of the arms 160 may be secured to a sleeve bushing 162 by a set screw 164 (see FIGURE 9). The sleeve bushings 162 are in end-abutting relationship to maintain the proper spacing between the arms. A pair of retainer rings 166 and 168 are set on the shaft 158 to maintain the bushings 162 properly located on the shaft 158.

Figures 9, 13:
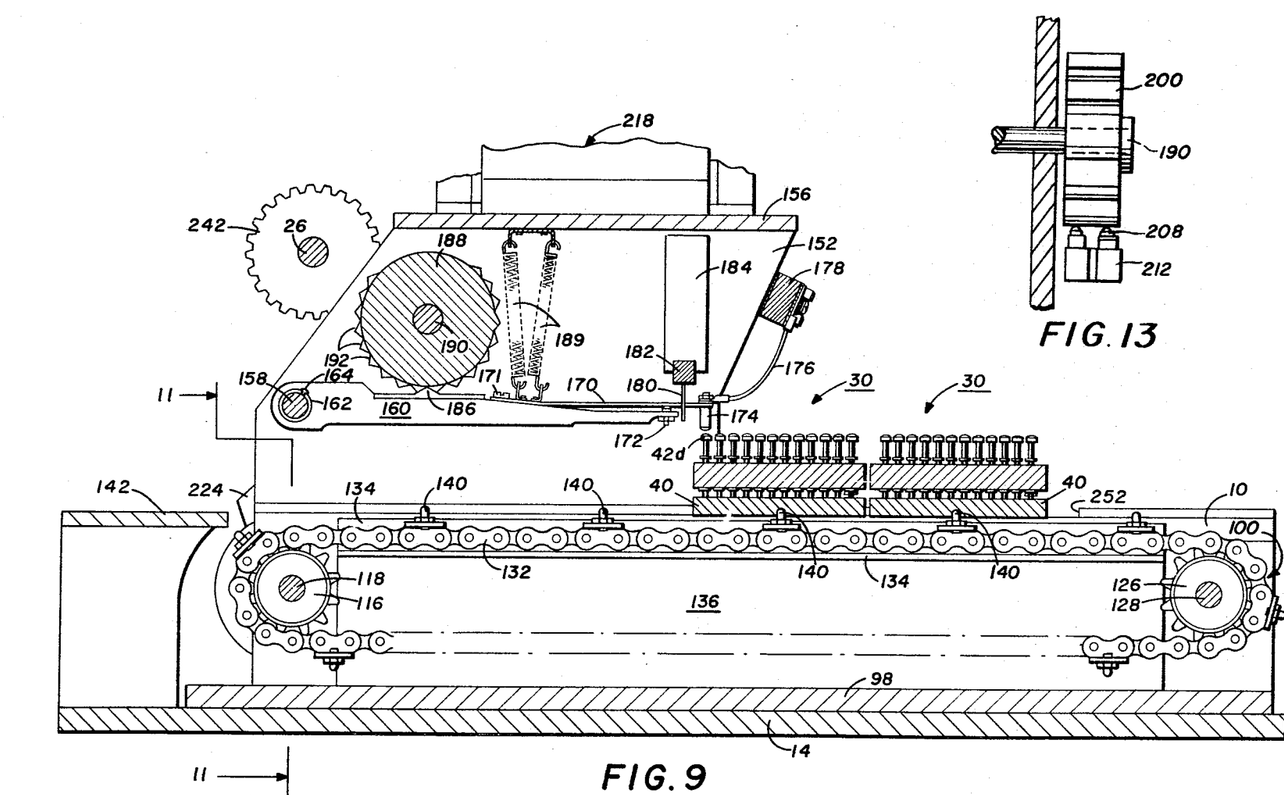
FIGURE 9 is a view taken substantially on lines 9—9 of FIGURE 2.
FIGURE 13 shows a section view of the commutator wheel 200 and one of the pairs of brush contacts 208.

The contact arms 160 extend generally parallel to the slide rails 102 and 104 and to each other. A leaf spring 170 is connected to a midpoint of each arm 160 by a screw 171 and extends beyond the end of the arm 160. An adjusting screw 172 extends through the end of the arm 160 and biases the spring 170 upwardly for purposes which will presently be described. A contact 174 is connected to, but insulated from, each of the springs 170. The several contacts 174 are aligned transversely of the slide rails 102 and 104 and form the welding station which will hereafter be referred to. The number of arms 160 and therefore the number of weld station contacts 174 corresponds to the number of electrodes 42 in each row, which, as illustrated, is eighteen. Each of the weld station contacts 174 is connected by an electrical cable 176 to a positive bus-bar 178 which is mounted on, but insulated from, the upright support 152. The ends of the arms 160 are held in proper spaced relationship by pegs 180 which extend downwardly between each adjacent pair of leaf springs 170 from a horizontal bar 182 which is connected to the upright support 152 by a gusset 184.

A cam drum 188 is mounted on a timing shaft 190 which is journaled in the supports 150 and 152. The cam drum 188 has a plurality of cam lobes 192 spaced around its circumference and aligned with the respective arms 160. Each of the arms 160 is biased upwardly by pairs of springs 189 interconnecting each arm and the top plate 156 and has an upwardly projecting cam 186 which rides on the drum 188. When the lobes 192 encounter the respective upstanding cams 186, the corresponding arm 160 is depressed downwardly so as to move the corresponding contact 174 against the corresponding electrode contact in the row positioned at the weld station as will hereafter be described in greater detail. The several lobes 192 are so spaced around the periphery of the drum that only one arm 160 is deflected downwardly at any point in time, and each arm is deflected only once during each revolution of the timing shaft. The cam lobes 192 are accumulated in one circumferential section of the drum 188 so as to provide approximately a quarter section during which the conveyor system 100 is indexed to position the next successive rows of electrode contacts under the weld station contacts 174 as will hereafter be described in greater detail.

A commutator wheel 200 is connected to the end of the timing shaft 190 which extends through the upright support 150. A first pair of brush contacts 202 is mounted on springs 204 which in turn are connected to brackets 206 which are adjustably bolted to the upright support 150. A second pair of contacts 208 is mounted on springs 210 connected to block 212 which in turn is adjustably bolted to the upright support 150.

The commutator wheel 200 is made from an insulating material and has electrically conductive inserts 200a disposed at points around its periphery. Each time that one of the electrically conductive inserts passes one of the pairs of brush contacts 202 or 208 (see FIGURE 13), a trigger circuit to the welding power supply is completed to fire the power supply as hereafter described. The conductive inserts 200a are so spaced around the periphery of the commutator wheel 200 that the circuit associated with the contact 202 is completed just after one of the arms 160 is depressed and the weld station contact 174 has engaged the corresponding electrode contact. Then the same conductive insert passes the second pair of brush contacts 208 just after the next successive arm 160 has been lowered and the weld station contact has engaged its corresponding electrode contact. By firing the power supply just after the weld station contact has engaged the electrode contact, arcing across the contacts is substantially eliminated.

When the power supply fires, a capacitor is discharged through the primary winding of a transformer indicated generally by the reference numeral 218 and conveniently mounted on the top plate 156. The secondary of the transformer 218 is connected to the bus-bar 178 so that the welding circuit is completed from the secondary winding of the transformer through the bus-bar 178, through the particular weld station contact 174 which is lowered against the electrode contact 42a, the weld electrode 42, the wire lead 46, eyelet 48, electrode plate 40 and rails 102 and 104 which are grounded.

The timing shaft 190 is also coupled to drive the shaft 118 and therefore the conveyor system 100 by an indexing ratchet means indicated generally by the reference numeral 220. The indexing ratchet means 220 is comprised of an eccentric 222 adjustably secured to the end of the timing shaft 190. The ratchet pawl 224 is connected to the throw of the eccentric 222 and drives a ratchet wheel 226 which is connected to the end of the shaft 118 only during the quarter of a revolution of the timing shaft during which the throw of the eccentric is moving toward the ratchet wheel 226. The ratchet wheel 226 has plurality of teeth 228 and side plates 230 and 232 for retaining the point of the pawl 224 in proper position. The indexing ratchet system indexes the conveyor chains 130 and 132 forward a distance corresponding to the distance between the rows of weld electrodes 42 one time during each revolution of the timing shaft 190. During the approximate quarter cycle of the timing shaft 190 required to index the conveyor system forward one row of weld contacts, no cam lobes 192 pass the cam 186 so that the contact arms 160 are inactive.

Figure 10:
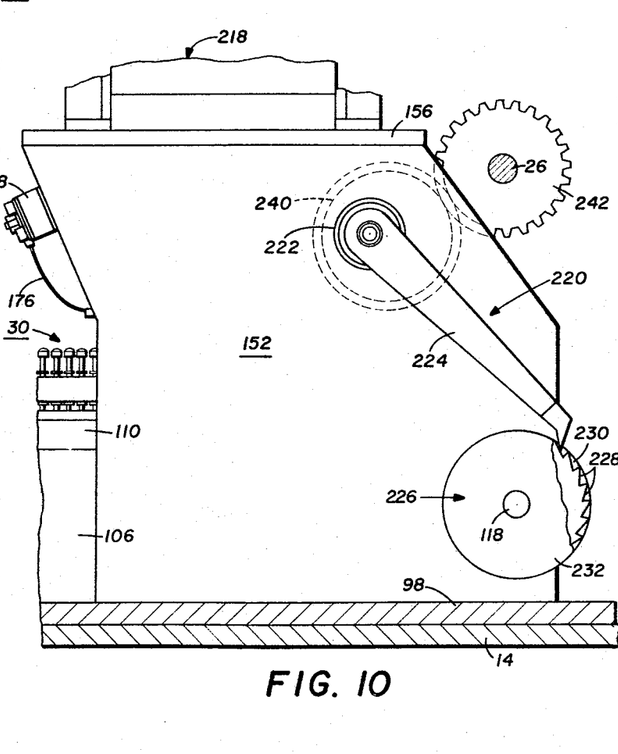
FIGURE 10 is a sectional view taken substantially on lines 10—10 of FIGURE 2.

The timing shaft 190 is driven from the shaft 26 by intermeshing gears 240 and 242 which are splined on the timing shaft 190 and drive shaft 26, respectively (see FIGURE 11). It will be noted that the gear 242 is mounted generally behind and slightly above the gear 240 so that the gears may be disengaged by sliding the entire welding subassembly 20 forward on the tabletop 14. Conversely, a welding subassembly 20 may be operatively connected to the drive shaft 26 merely by sliding the subassembly into position to engage the gears 240 and 242 (see FIGURE 10). This position is permanently indicated by an L-shaped stop 244 bolted to the tabletop 14 which receives the right rear corner of the base plate 98 and a similar stop 246 at the right-hand edge of the base plate 98 near the front. A pair of bolts 248 and 250 may pass through the base plate 98 and be threaded into the tabletop 14 to secure the subassembly 20 in position (see FIGURE 2).

*Operation*

When operating the machine 10, the motor 22 is energized so as to drive the shaft 26 continuously. This in turn drives the timing shafts 190 of each of the welding stations 20 continuously through the intermeshing gears 240 and 242. As each of the timing shafts 190 rotates, the contact arms 160 are sequentially depressed against the tension of springs 189 by the action of the cam lobes 192 on the cams 186. The upward pivotal movement of the arms 160 is limited by the cams 186 which ride on the constant radius of the cam drum 188. A split second after each contact arm 160 is deflected, the trigger circuit to the power supply is completed through either of the pair of contacts 202 or 208, and the power supply discharges through the primary winding of the transformer 218. However, if no weld station contact 174 has completed a circuit to an electrode contact 42d, the circuit in which the secondary winding is connected will be open and no appreciable power will be dissipated. After all cam lobes 192 have passed the cams 186 of the arms 160, and therefore after all of the arms 160 have been depressed one time, the indexing ratchet mechanism 220 moves the conveyor chains 130 and 132 forward by a distance equal to the spacing between the rows of electrodes of the fixture block assembly 30. The cycle is then repeated.

In order to obtain a maximum production rate, it is necessary to have a number of fixture block assemblies 30 so that the assemblies can be filled at a sufficient rate to insure that a fixture block assembly is always being processed by each of the three welding subassemblies 20. The fixture block assemblies 30 are loaded by inverting the electrode plate 32 and inserting the lead wires 46 in the electrodes 42. The enlarged heads 46a of the lead wires hold the lead wires in proper position within the electrodes while the electrode plate 32 may be inverted and the electrode contacts 54 placed on a flat surface. The snap rings 50 limit the travel of the plate 32 and the ends 42c of the electrodes then all lie in approximately the same plane so as to facilitate easy loading from a transfer plate. The eyelets 48 are loaded in the eyelet tray 36 and the retaining plate 34 placed in position over the eyelet tray. The two together can then be inverted and placed over the guide pins 56 and therefore over the ends of the electrodes 42b. Positioning of the eyelet tray 36 on the guide pins 56 then permits the sandwiched assembly to be turned back right side up since the eyelets 48 will hold the lead wires 46 in place. The spacer plate 38 and electrode plate 40 can be placed over the guide pins 56 when convenient.

After the fixture block assembly has been loaded and assembled, it is placed on the slide rails 102 and 104 with the lugs 138 and 140 protruding into bores in the bottom face of the electrode plate 40. This may be facilitated by finger notches 252 formed in the slide rails 102 and 104 and in the retaining plates 110 and 112. The fixture assembly 30 is then indexed forward on the slide rails by the chains 130 and 132. When the first row of electrode contacts 42d arrives at the weld station, i.e., is positioned under the weld station contacts 174, the weld station contacts 174 are sequentially moved against the respective electrode contacts 42d as heretofore described. An instant after each weld station contact 174 engages the electrode contact 42d, the power supply fires and drives a current through the corresponding weld electrode 42, lead wire 46, eyelet 48 and the electrode plate 40 to the slide rails 102 and 104 which are connected to ground. All of the current must pass through the head 46a of the lead wire 46 to the eyelet 48 so that the lead wire and eyelet are resistively heated at the point of contact and fused together.

After the weld station contact 174 contacts the electrode contact 42d, the contact arm 160 has moved downwardly a greater distance than the contact 174 so that the leaf spring 170 is loaded by movement away from the adjusting screw 172. Thus as the head 46a of the lead wire 46 is fused to the eyelet 48, the spring 170 maintains a pressure on the electrode 42 to insure a good weld. Contact is maintained between the weld station contact 174 and the electrode 42 until the leaf spring 170 is engaged by the adjusting screw 172 as the pivot arm returns to rest position. The screws 172 also provide a means to adjust the height of the weld station contacts 174 when the arms 160 are in the raised position.

After all of the weld contacts 174 have been sequentially lowered against the respective electrode contacts 42d, the indexing ratchet mechanism moves the conveyor system forward so that the next row of electrode contacts 42d is positioned under the weld station contacts 174. It should be noted that positioning of the electrode contacts under the weld station contacts 174 need not be accomplished with any significant degree of precision because only an electrically conducting path is required between the two contacts. This is facilitated by slightly rounding both contacts as illustrated. After a fixture block assembly 30 has passed through the welding station, it is forced onto the apron 142. In due course the finished units may be removed from the fixture block assembly which can then be reloaded and recycled through the machine.

From the above detailed description of a preferred embodiment of the invention, it will be appreciated that an unusually simple machine for performing this type of work has been described. The machine may be placed in continuous operation and will automatically operate on a loaded fixture block assembly whenever the fixture block assembly is placed on the conveyor system. There are very few precision parts in the machine so that it can be constructed on a very economical basis. Yet the lead wires may be welded at precise locations on the eyelets by reason of the precision construction of the fixture block assemblies. A variety of sizes and shapes of eyelets can be welded on the same machine, and the lead wires can be welded to various quadrants of the eyelets, merely by changing the eyelet tray 36, spacer plate 38 and retainer plate 34. The machine may also be used to weld lead wires to other types of disk-shaped components, and indeed can be used to weld two members of almost any shape by modification of the electrodes and the means for holding the members in weld positions.

The production rate of the machine is limited primarily by the rate at which the electric power supply can be fired. Most electric power supplies of this type operate by discharging a capacitor through the primary winding of a transformer, the secondary winding of the transformer being connected to apply power through the weld electrode circuit. In one embodiment of the invention, one power supply of this type was used for each welding subassembly 20 and the weld station electrodes 174 were lowered against the electrode contacts at the rate of eight per second. In this embodiment, a rate of 40,000 units per hour has been achieved with a mechanical efficiency of 98%.

It is customarily desirable to operate this type of welding machine for long periods of time without stopping, and it is important to have a minimum down time for repairs, adjustments and cleaning. Accordingly, it is desirable to have spare welding subassemblies 20 so that the subassemblies can be exchanged as needed. This is accomplished merely by removing the two bolts 248 and 250 from the base plate, disconnecting the electrical connections, which may be quick-disconnect couplings, and sliding the base plate 98 and entire assembly from the table top 14. The substitute subassembly may then be slipped into the stops 244 and 246, bolted in position by the bolts 248 and 250 and connected into the electrical circuit. This can easily be accomplished within a span of five minutes.

Although a preferred embodiment of the invention has been described in detail, it is to be understood that various changes, substitutions and alterations can be made in the various parts and combinations thereof without departing from the spirit and scope of the invention as defined by the appended claims.

What is claimed is:

1. In an automatic welding machine for resistively welding a first member to a second member, the combination of:
- a fixture block assembly for holding a plurality of pairs of the first and second members mated in welding position, the fixture block assembly being in electrical contact with one member of each pair and including a weld electrode for each pair of members, each weld electrode being electrically insulated from the remainder of the fixture block assembly for selectively applying a weld current to the other member of each pair, each weld electrode having an electrode contact accessible from without the fixture block assembly,
- a welded station comprised of a plurality of weld station contacts, means for selectively moving each of the weld station contacts into engagement with an electrode contact aligned at the weld station, and a ground contact for engaging the fixture block assembly,
- an electrical power supply connected to the weld station contacts for applying a weld current through the circuit comprised of a weld station contact, an electrode contact, a weld electrode, the members of the pair, the fixture block assembly and the ground contact, and
- a conveyor system for indexing the fixture block assembly past the weld station such that the weld station contacts may be selectively moved into engagement with the electrode contacts positioned at the weld station and a current driven through each pair of members to thereby resistively weld the members together.

2. In an automatic welding machine for resistively welding first and second members, the combination of:
- a fixture block assembly for welding a plurality of pairs of first and second members in mated weld position, the fixture block assembly including a weld electrode for each pair of members electrically insulated from the remainder of the fixture block assembly for conducting a weld current only to one of each pair of members, each weld electrode having an electrode contact, the electrode contacts being disposed in a plurality of generally parallel rows each having a generally corresponding number of electrode contacts disposed generally in the same plane, the fixture block assembly having electrically conductive means contacting the other member of each pair for providing an electrically conducted path from said member to the supporting face of the fixture block assembly,
- an electrically conductive slide rail for supporting the fixture block assembly, the slide rail being electrically connected to ground,
- a conveyor system connected to the slide rail for indexing the fixture block assembly along the slide rail to successively position each row of electrode contacts at a welding station with the row of electrodes disposed generally normal to the direction of travel along the conveyor system,
- a plurality of welding station contacts disposed at the weld station, the number of welding station contacts corresponding to the number of electrode contacts in each row and being spaced to engage the corresponding electrode contacts in each row,
- means for selectively moving each of the weld station contacts against the respective electrode contact to complete an electric circuit from the weld station contact through the electrode contact, the weld electrode, the pair of members, the fixture block assembly and the slide rail to ground, and
- an electrical power supply connected to the weld station contact for applying weld current through said circuit.

3. In an automatic welding machine for resistively welding a wire lead to an eyelet or the like, the combination of:
- a fixture block assembly for holding a plurality of lead wires in weld position against a corresponding number of eyelets, the fixture block assembly including a tubular weld electrode electrically insulated from the remainder of the fixture block assembly and disposed around and retaining the lead wire, each weld electrode having an electrode contact extending upwardly from the fixture block assembly and disposed generally in a plane common to all other electrode contacts, the electrode contacts being arranged in a plurality of generally parallel rows each having a corresponding number of weld electrodes,
- support means,
- an electrically conducting, elongated slide rail means connected to the support means for slidably supporting the fixture block assembly,
- conveyor means connected to the support rail means for sliding the fixture block assembly along the slide rail means,
- a plurality of arms pivotally connected to the support means, the arms extending generally parallel one to the other and parallel to the slide rail means and being disposed above the slide rail means, the number of arms corresponding to the number of electrode contacts in each of said rows,
- a weld station contact connected to a free end of each arm, the weld station contacts being aligned with the corresponding electrode contacts positioned at the weld station whereby each of the weld station contacts may be selectively moved into engagement with the corresponding electrode contact by pivotal movement of the corresponding arm,
- spring means connected to the support for biasing each of the arms into a raised position such that the weld station contacts will be disposed above electrode contacts disposed at the weld station,
- a timing shaft journaled in the support above the pivoted arms and extending generally normal to the pivoted arms,
- drive means coupled to the timing shaft for rotating the timing shaft,
- indexing means interconnecting the timing shaft and the conveyor means for moving the conveyor means one position forward in response to a predetermined degree of rotation of the timing shaft to sequentially position the rows of electrode contacts at the weld station,
- a cam drum connected to the timing shaft having a plurality of cam means for sequentially engaging each of the arms to pivotally move the arms downwardly and press the weld station contact thereon against the corresponding electrode contact in the row positioned at the weld station, and
- an electrical power supply connected to the weld station contacts through a commutator assembly driven by the timing shaft, the commutator assembly completing a circuit from the power supply to the weld station contacts each time that a weld station contact is moved against an electrode contact.

4. The combination defined in claim 3 wherein:
- the conveyor means comprises endless chain means disposed around first and second sprocket means secured on first and second parallel axles, respectively, journaled on the support means, and
- the indexing means comprises a toothed ratchet wheel connected to one axle, a third axle connected eccentrically to the timing shaft, and a ratchet pawl journaled on the third axle and engaging the ratchet wheel.

5. In an automatic welding machine for resistively welding two members, the combination of:
- a grounded support means for supporting a fixture assembly for holding a pair of members in weld position with one member contacting a weld electrode, the end of which protrudes from the fixture and the other member being in electrical contact with the support means, an arm pivotally connected to the support means and extending over the support means, an electric contact connected to the free end of the arm and insulated therefrom for connection to an electric power supply, actuating means for selectively pivoting the arm to move the contact into engagement with the protruding end of the weld electrode whereby an electrical current may be passed from the contact through the weld electrode and the two members to the grounded support means, and an indexing conveyor means connected to the support means for advancing a fixture assembly along the support means a predetermined distance to sequentially position a plurality of weld electrodes adjacent the electric contact, the indexing conveyor means being operated in timed synchronism with the actuating means to advance the fixture only when the arm is not actuated.

6. The combination defined in claim 5 further characterized by:

a fixture assembly for holding a plurality of pairs of members in weld position with one member of each pair in electrical contact with the fixture assembly and having a weld electrode in contact with the other member of each pair, the weld electrode being electrically insulated from the remainder of the fixture assembly and being spaced apart a distance corresponding to the predetermined distance the fixture assembly is advanced by the indexing conveyor means.

7. The combination defined in claim 5 wherein:

there is a plurality of said arms pivotally connected to the support means, a contact connected to each arm, the actuating means selectively pivots all of the arms in sequence, and further characterized by means for connecting each of the contacts to a common power supply.

8. In an automatic welding machine for resistively welding two members, the combination of:

an electrically conductive support means, a plurality of electric contacts disposed over the support means, actuating means for sequentially moving the contacts toward the support means for engaging the end of a weld electrode of a fixture assembly disposed on the support means, and means for connecting a single electric power supply to all of the contacts.

9. The combination defined in claim 8 further characterized by:

conveyor means for indexing a fixture assembly with a plurality of rows of weld electrodes protruding upwardly from the fixture past the electric contacts a predetermined distance after each of the contacts has been moved toward the support means.

10. The combination defined in claim 8 further characterized by:

trigger means synchronized with the actuating means for turning on an electric power supply connected to the contacts after each contact has been moved toward the support means.

11. A fixture assembly for welding first and second members in an automatic welding machine, the fixture assembly unit being a self-contained unit separate from any support or power means and comprising:

a first fixture member for supporting a plurality of the first members in a plurality of rows, each row having a plurality of said members, the first members being in electrical contact with the first fixture member, and a second fixture member mated with the first fixture member for holding a second member in weld position against each of the first members supported by the first fixture member and insulated from the first fixture member except through the respective first member and second member and including an electrically conductive means for each second member for selectively applying an electric potential between the respective second and first members to cause a weld current to flow therebetween, each of the electrically conductive members being electrically insulated one from the other and extending from the second fixture member, whereby upon the engagement of said extended ends of said electrodes protruding from the fixture with an electrical contact and the application of electric power to said contact and to said electrodes, said first and second members are welded.

12. In a fixture assembly for welding a lead wire or the like to an eyelet or the like, the combination of:

an eyelet fixture member for holding a plurality of eyelets in a plurality of rows each containing a plurality of eyelets, the eyelets being in electrical contact with the fixture member, and a wire lead fixture member mated to the eyelet fixture member and having seated therein a plurality of tubular electrodes electrically insulated one from the other for retaining a wire lead therein with the wire lead protruding from one end of the electrode into contact with the respective eyelet, the other ends of the electrodes protruding from the fixture, whereby upon the engagement of said other ends of the electrodes protruding from the fixture with an electrical contact and the application of electric power to said contact and said electrodes, lead wires and eyelets are welded.

13. The combination defined in claim 12 wherein the eyelet fixture member includes:

an eyelet tray assembly having an aperture therethrough for receiving each of the eyelets, the eyelets extending through the tray, a retaining plate over the eyelet tray for retaining the eyelets as the tray is inverted for mating with the wire lead fixture member, the retaining plate having an aperture therein for passing each lead wire and electrode, and an electrically conductive electrode plate over the other side of the eyelet tray assembly in contact with each of the eyelets.

14. The combination defined in claim 13 wherein the eyelet tray assembly is comprised of:

an eyelet tray in which each of the apertures is larger than the body of the eyelet, and a spacer plate mated therewith in which each of the apertures is smaller than the aperture in the eyelet tray but larger than the body of the eyelet.

References Cited

UNITED STATES PATENTS

| | | | |
|---|---|---|---|
| 1,006,536 | 10/1911 | Dean | 219—78 |
| 1,609,749 | 12/1926 | White | 219—78 |
| 1,754,948 | 4/1930 | Hatch | 219—56 |
| 2,355,444 | 8/1944 | Kenny | 219—78 |
| 2,474,340 | 6/1949 | Warner | 219—86 |
| 2,688,065 | 8/1954 | Clark | 219—86 |
| 3,294,948 | 12/1966 | Fegley et al. | 219—78 |

RICHARD M. WOOD, *Primary Examiner.*

B. A. STEIN, *Assistant Examiner.*